(12) United States Patent
Hietalahti et al.

(10) Patent No.: US 7,313,111 B2
(45) Date of Patent: Dec. 25, 2007

(54) METHOD AND APPARATUS FOR INDICATING SERVICE SET IDENTIFIERS TO PROBE FOR

(75) Inventors: Hannu Hietalahti, Kiviniemi (FI); Pasi Eronen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/999,397

(22) Filed: Nov. 29, 2004

(65) Prior Publication Data

US 2005/0147073 A1 Jul. 7, 2005

Related U.S. Application Data

(60) Provisional application No. 60/534,840, filed on Jan. 6, 2004.

(51) Int. Cl.
*H04Q 7/24* (2006.01)
*H04Q 7/00* (2006.01)
*H04M 1/00* (2006.01)

(52) U.S. Cl. .................. 370/329; 709/217; 455/552.1; 370/338; 370/395.3

(58) Field of Classification Search ............ 455/552.1, 455/426.1, 41.2, 522.1, 522; 370/328, 329, 370/338, 349, 395.3, 449, 330; 709/217, 709/224, 245; 711/170, 172, 173, 200, 202, 711/205
See application file for complete search history.

(56) References Cited

U.S. PATENT DOCUMENTS

| | | | |
|---|---|---|---|
| 5,745,699 A * | 4/1998 | Lynn et al. | 709/245 |
| 2004/0110530 A1 * | 6/2004 | Alone et al. | 455/552.1 |
| 2005/0070279 A1 * | 3/2005 | Ginzburg et al. | 455/434 |

* cited by examiner

*Primary Examiner*—Afsar Qureshi
(74) *Attorney, Agent, or Firm*—Ware, Fressola, Van Der Sluys & Adolphson LLP

(57) ABSTRACT

A method for use by a WLAN terminal in determining which of at least some SSIDs on a preferred SSID list hosted by the WLAN terminal are available at one or another accessible WLAN access point, based on sending probe messages to accessible WLAN access points, each probe message indicating a respective SSID, but sending such a probe message for an SSID on the list only if a respective indicator included in the list indicates that the WLAN terminal is to probe for the SSID.

26 Claims, 1 Drawing Sheet

METHOD AND APPARATUS FOR INDICATING SERVICE SET IDENTIFIERS TO PROBE FOR

CROSS REFERENCE TO RELATED APPLICATION

Reference is made to and priority claimed from U.S. provisional application Ser. No. 60/534,840, filed Jan. 6, 2004, entitled MARKING OF SSIDS TO PROBE.

TECHNICAL FIELD

The present invention pertains to the field of wireless local area network services. More particularly, the present invention pertains to a WLAN terminal probing for SSIDs.

BACKGROUND ART

A service set identifier (SSID) is a 32-character unique identifier attached to the header of packets sent over a wireless local area network (WLAN) that functions as a password when a mobile device tries to connect to a basic service set (BSS). Each set of wireless devices communicating directly with each other is called a BSS. Several BSSs can be joined together to form one logical WLAN segment, referred to as an extended service set (ESS). A SSID is simply the 1–32 byte alphanumeric name given to an ESS.

The SSID thus differentiates one WLAN from another, so all access points (a hardware device or a computer's software that acts as a communication hub for users of a wireless device to connect to a wired LAN) and all devices attempting to connect to a given WLAN must use the same SSID for the given WLAN. A device is typically not permitted to join a BSS unless it can provide the unique SSID for the BSS. An SSID is also referred to as a network name because it in effect is a name that identifies a (wireless local area) network.

A WLAN includes one or more access points and two or more stations. For example, a WLAN (ESS) for a department of a company may have several access points and include dozens of stations, all using the same SSID. Another department of the company, located in the same building, may operate its own departmental WLAN, composed of access points and stations using a different SSID. The purpose of the SSID is to help stations in say the first department find and connect to access points for the WLAN of the first department, ignoring access points belonging to the second department.

Each access point advertises its presence several times per second by broadcasting beacon frames that carry the ESS name, i.e. the SSID. Stations can discover access points for an ESS by passively listening for beacons, or they can send probe frames to actively search for an access point with the SSID of the ESS. Once the station locates an appropriately-named access point, it can send an associate request frame containing the desired SSID. The access point replies with an associate response frame, also containing the SSID.

Wireless devices thus use the SSID to establish and maintain connectivity. As part of an association process, a wireless network interface card (NIC) for a station of a WLAN must have the same SSID as the (one or more) access point(s) for the WLAN. Traditional access points are only capable of supporting a singe SSID, but now some companies are offering enterprise-class access points that support multiple SSIDs. Multiple SSIDs allow users to access different networks through a single access point. Network managers can assign different policies and functions for each SSID, increasing the flexibility and efficiency of the network infrastructure. The use of multiple SSIDs means more flexibility when deploying a shared WLAN infrastructure. Instead of supporting only one type of application, possibly one that requires significant authentication and encryption, the WLAN can also maintain other types of applications.

In order to indicate the availability of WLAN services, and as indicated above, a WLAN access point regularly sends broadcast beacon messages containing its SSID. A single WLAN access point can broadcast one or multiple SSIDs, each in a separate beacon message.

In addition to the broadcast SSIDs, a WLAN access point may support other SSIDs not advertised in the beacon messages. There are several reasons why a WLAN access point might not broadcast some SSIDs. First, while most WLAN access points support multiple SSIDs, they can usually send beacon messages only for one of those SSIDs. Second, in case of private (e.g., corporate or residential) WLANs, sending beacon messages may make it easier for outsiders to detect the presence of a WLAN network.

The only way for a mobile WLAN terminal to find out about these additional SSIDs is to send a broadcast probe message, asking if any WLAN access point nearby supports a particular SSID. When a WLAN access point supporting that SSID receives a probe message, it replies with a probe response message.

Thus, a WLAN terminal finds out about the broadcast SSIDs from all available WLAN access points by passively receiving the broadcast information (beacon messages). But this does not guarantee that all available SSIDs are known to the WLAN terminal.

In order for a WLAN terminal to send probe messages, it needs to know the SSID values it is interested in, which are included in the WLAN terminal in what is called a preferred SSID list. A preferred SSID list can be quite long, and sending a probe message for each SSID on the list can have a significant impact on a WLAN terminal's power budget, and can also affect the WLAN terminal's time and radio capacity. It would therefore be advantageous to be able to avoid sending a probe message for each SSID on a preferred SSID list.

The above-described situation has not been addressed by the prior art, since the preferred SSID list is related to the 3GPP-WLAN interworking terminal. Current WLAN solutions (for laptops) expect the user to manually select one of the SSIDs sent in beacon messages, or to type in the SSID that should be probed. Thus, a situation where the WLAN terminal would have to probe multiple SSIDs does not arise.

DISCLOSURE OF THE INVENTION

In view of the above-described situation, in a first aspect of the invention, a method is provided for use by a wireless local area network (WLAN) terminal in determining which of at least some service set identifiers (SSIDs) on a preferred list of SSIDs hosted by the WLAN terminal are available at a WLAN access point, the method including a step of sending probe messages so as to be received by accessible WLAN access points, each probe message indicating a respective SSID, the method including a step of sending a probe message for an SSID on the preferred list of SSIDs only if an indicator associated with the SSID on the list indicates that the WLAN terminal is to probe for the SSID.

In accord with the first aspect of the invention, the list may include the indicator indicating that the WLAN terminal is to probe for the SSID.

Also in accord with the first aspect of the invention, the indicator may be stored separately from the list but so as to have a well-defined association with the SSID on the list.

Also in accord with the first aspect of the invention, the indicator may be stored in a memory card of the WLAN terminal.

Also in accord with the first aspect of the invention, the indicator may be stored in a subscriber identification module used with the WLAN terminal.

In a second aspect of the invention, an apparatus is provided for use by a WLAN terminal in performing a method according to the first aspect of the invention.

BRIEF DESCRIPTION OF THE DRAWINGS

The above and other objects, features and advantages of the invention will become apparent from a consideration of the subsequent detailed description presented in connection with accompanying drawings, in which:

FIG. 2 is a block diagram of a WLAN terminal showing elements pertinent to the invention, namely a memory structure hosting the preferred SSID list of the WLAN terminal, with the preferred SSID list including an indicator/flag for each SSID on the list indicating whether the SSID is to be probed for.

DETAILED DESCRIPTION OF THE INVENTION

The invention is of use by a wireless local area network (WLAN) terminal in determining which of at least some service set identifiers (SSIDS) on a preferred list of SSIDs hosted by the WLAN terminal are available at a WLAN access point. According to the invention, a preferred SSID list is provided in which either each SSID on the list has a flag or other indicator for indicating whether the SSID should be probed for, or at least the list includes some basis for determining whether any given SSID on the list should be probed for. With flags/probe indicators indicating whether the SSIDs on the list should be probed for, a WLAN terminal can skip probing for SSIDs expected to be broadcast in beacon messages. The flag (and the preferred SSID list) may be input or preprogrammed by the user, operator, manufacturer or other service administrator, or downloaded to the WLAN terminal over a radio interface.

In one embodiment of the invention, the preferred SSID list would contain flags only for the SSID's of the home operator and only few others—the most important ones—so that the user would not miss those. Otherwise there might be dozens.

Figure 1:
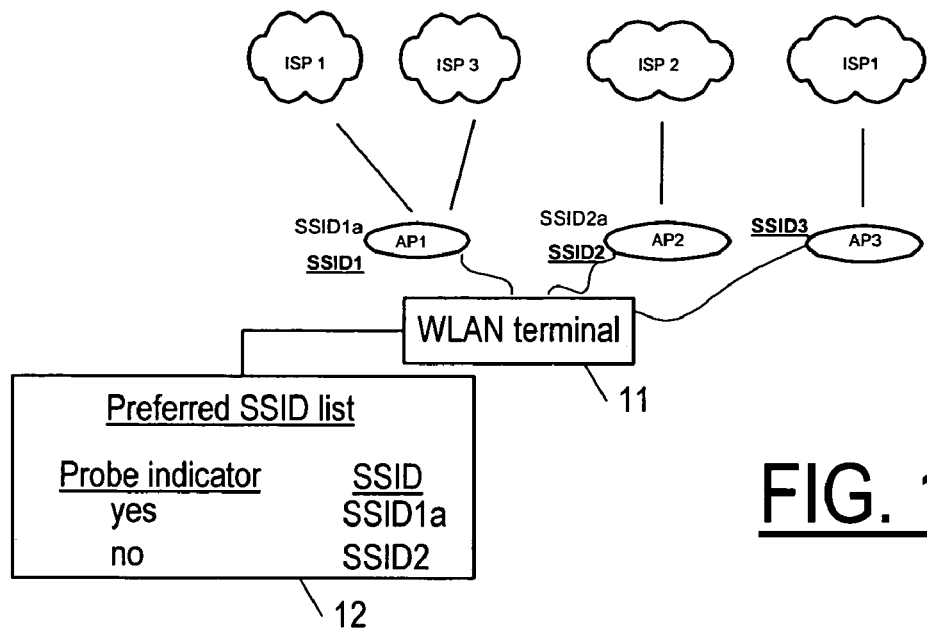
FIG. 1 is a schematic illustration of a WLAN terminal probing to determine what SSIDs are supported by WLAN access points accessible to the WLAN terminal.

FIG. 1 shows a WLAN terminal 11 and an associated preferred SSID list 12, and also three different WLAN access points—AP1, AP2, and AP3. The first access point, AP1, supports SSIDs indicated as SSID1 (sent in beacon messages) and SSID1a (not sent in beacon messages). As indicated in the preferred SSID list 12, the WLAN terminal's most preferred SSID is SSID1a, but in order to discover that it is available at the first access point, the WLAN terminal must send a probe message. The invention provides an indicator indicating that only SSID1a is to be probed for, but not SSID2, which is sent in a beacon message.

Figure 2:
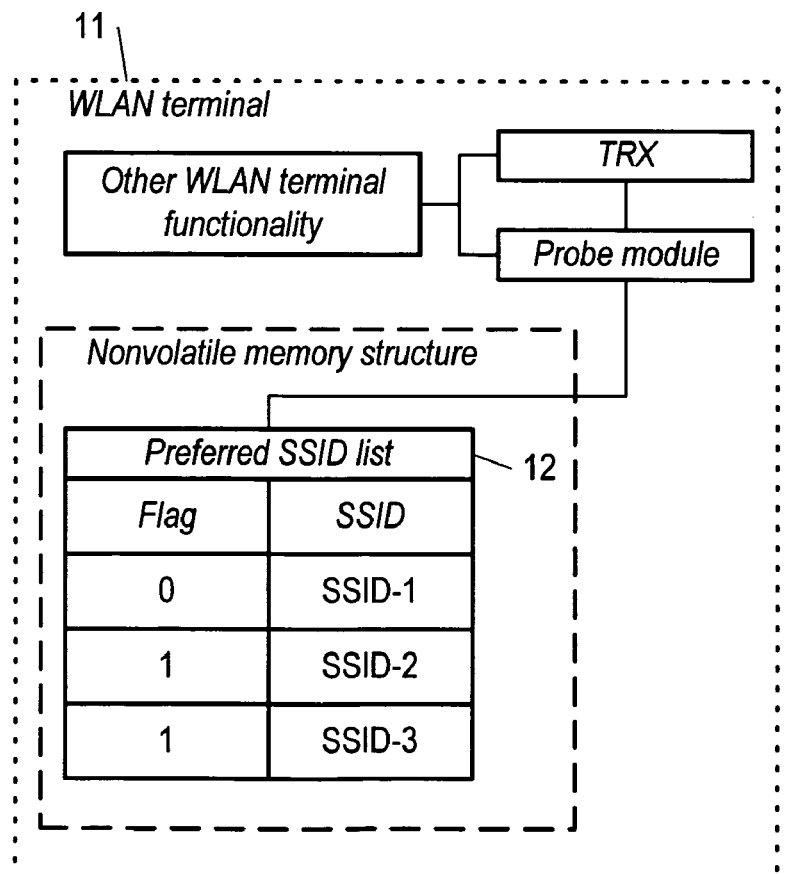

Referring now to FIG. 2, the preferred SSID list 12 of the WLAN terminal 11 is shown in a typical arrangement in which it is stored in a non-volatile memory structure included in the WLAN terminal. The SSID list could also be stored in a subscriber identification module used with the WLAN terminal. The flags/probe indicators associated with respective SSIDs on the SSID preferred list can be stored with the list or separate from the list, e.g. in a separate table of a relational database type of data base. A WLAN terminal according to the invention would, as shown in FIG. 2, also typically include a probe module for probing for SSIDS on the preferred SSID list, using a transceiver (TRX) for transmitting and receiving signals in connection with the probing.

The flags/probe indicators can be provided as part of and at the same time as the SSID preferred list, or can be provided separately or later in time. For example, the SSID preferred list can be provided with a placeholder for a flag/probe indicator value, which can then be set later e.g. by an operator or software vendor or even by the user. It is even possible for the flags/probe indicators to be set automatically by the WLAN terminal by monitoring beacons to learn which SSIDs are broadcast and to then set the flag/probe indicator so as to keep the WLAN terminal from probing for the SSIDs included in the beacon messages.

Whether the probe signals are sent by the WLAN terminal addressed to respective particular WLAN access points or instead are broadcast to all accessible WLAN access points is not the subject of the invention.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method for use by a wireless local area network terminal, comprising:
    selecting a service set identifier from a list of preferred service set identifiers to probe for at wireless local area network access points;
    determining if an indicator hosted by the wireless local area network terminal and associated with the selected service set identifier indicates that the wireless local area network terminal is to probe for the selected service set identifier; and
    probing for the selected service set identifier if and only if the indicator indicates that the wireless local area network terminal is to probe for the selected service set identifier.

2. A method as in claim 1, wherein the list includes the indicator indicating that the wireless local area network terminal is to probe for the selected service set identifier.

3. A method as in claim 1, wherein the indicator is stored separately from the list but so as to have a well-defined association with the selected service set identifier on the list.

4. A method as in claim 1, wherein the indicator is stored in a memory card of the wireless local area network terminal.

5. A method as in claim 1, wherein the indicator is stored in a subscriber identification module used with the wireless local area network terminal.

6. An apparatus for use by a wireless local area network terminal comprising:
- means for selecting a service set identifier from a list of preferred service set identifiers to probe for at wireless local area network access points;
- determining if an indicator hosted by the wireless local area network terminal and associated with the selected service set identifier indicates that the wireless local area network terminal is to probe for the selected service set identifier; and
- means for probing for the selected service set identifier if and only if the indicator indicates that the wireless local area network terminal is to probe for the selected service set identifier.

7. An apparatus as in claim 6, wherein the list includes the indicator indicating that the wireless local area network terminal is to probe for the selected service set identifier.

8. An apparatus as in claim 6, wherein the indicator is stored separately from the list but so as to have a well-defined association with the selected service set identifier on the list.

9. An apparatus as in claim 6, wherein the indicator is stored in a memory card of the wireless local area terminal.

10. An apparatus as in claim 6, wherein the indicator is stored in a subscriber identification module used with the wireless local area network terminal.

11. A method, comprising:
- selecting a service set identifier from a list of service set identifiers stored in a wireless terminal; and
- preparing a probe message for the service set identifier if an indicator is stored in the wireless terminal and associated with the service set identifier and if and only if the indicator indicates that the wireless terminal is to probe for the service set identifier.

12. A method as in claim 11, wherein the list includes the indicator indicating that the wireless terminal is to probe for the service set identifier.

13. A method as in claim 11, wherein the indicator is stored separately from the list but so as to have a well-defined association with the service set identifier on the list.

14. A method as in claim 11, wherein the indicator is stored in a memory card of the wireless terminal.

15. A method as in claim 11, wherein the indicator is stored in a subscriber identification module used with the wireless terminal.

16. An apparatus, comprising:
- means for storing in a wireless terminal a list of service set identifiers and also for storing respective associated indicators for at least some of the plurality of service set identifiers, each service set identifier for indicating a respective wireless local area network; and
- means for selecting a service set identifier from the list of service set identifiers, and for preparing a probe message for the service set identifier if an indicator is stored in the wireless terminal and associated with the service set identifier and if and only if the indicator indicates that the wireless terminal is to probe for the service set identifier.

17. An apparatus as in claim 16, wherein the list includes the indicator indicating that the wireless terminal is to probe for the service set identifier.

18. An apparatus, comprising:
- a memory device, storing a list of service set identifiers and also for storing respective associated indicators for at least some of the plurality of service set identifiers, each service set identifier for indicating a respective wireless local area network; and
- a probe module, for selecting a service set identifier from the list of service set identifiers, and for preparing a probe message for a wireless terminal to use in probing for the service set identifier if an indicator is stored in the memory device and associated with the service set identifier and if and only if the indicator indicates that the wireless terminal is to probe for the service set identifier.

19. An apparatus as in claim 18, wherein the list includes the indicator indicating that the wireless terminal is to probe for the service set identifier.

20. An apparatus as in claim 18, wherein the memory device is configured to store the indicator separately from the list but so as to have a well-defined association with the service set identifier on the list.

21. An apparatus as in claim 18, wherein the memory device is configured to store the indicator in a memory card of the wireless terminal.

22. An apparatus as in claim 18, wherein the memory device is configured to store the indicator in a subscriber identification module used with the wireless terminal.

23. A wireless terminal, comprising:
- an apparatus according to claim 18; and
- a transceiver, for transmitting the probe message, and for receiving a response thereto.

24. A probe module, by which a wireless terminal is operative, comprising means for selecting a service set identifier from a stored list of service set identifiers, and means for preparing a probe message for the service set identifier if an indicator is also stored and associated with the service set identifier and if and only if the indicator indicates that the service set identifier is to be probed for.

25. A method, comprising:
- storing in a wireless terminal a plurality of service set identifiers for indicating a respective wireless local area network; and
- storing in the wireless terminal respective associated indicators for at least some of the plurality of service set identifiers, wherein the indicator for a service set identifier is set to indicate whether the service set identifier is to be probed for, and the service set identifier is probed for if and only if the associated indicator indicates that the respective service set identifiers is to be probed for after it is selected from among the plurality of service set identifiers.

26. A method as in claim 25, wherein the indicators are stored in a memory card or in a subscriber identification module of the wireless terminal.

* * * * *

UNITED STATES PATENT AND TRADEMARK OFFICE
CERTIFICATE OF CORRECTION

| | |
|---|---|
| PATENT NO. | : 7,313,111 B2 |
| APPLICATION NO. | : 10/999397 |
| DATED | : December 25, 2007 |
| INVENTOR(S) | : Hietalahti et al. |

Page 1 of 1

It is certified that error appears in the above-identified patent and that said Letters Patent is hereby corrected as shown below:

In column 5, line 23, claim 9, line 2, after "area", --network-- should be inserted.

Signed and Sealed this

Seventeenth Day of June, 2008

JON W. DUDAS
*Director of the United States Patent and Trademark Office*